(12) United States Patent
Sundholm

(10) Patent No.: US 6,810,662 B2
(45) Date of Patent: Nov. 2, 2004

(54) METHOD AND APPARATUS FOR PURIFYING A GAS FLOW

(75) Inventor: Göran Sundholm, Tuusula (FI)

(73) Assignee: Marioff Corporation Oy, Vantaa (FI)

(*) Notice: Subject to any disclaimer, the term of this patent is extended or adjusted under 35 U.S.C. 154(b) by 0 days.

(21) Appl. No.: 09/972,682

(22) Filed: Oct. 16, 2001

(65) Prior Publication Data

US 2002/0059794 A1 May 23, 2002

Related U.S. Application Data

(63) Continuation-in-part of application No. PCT/FI01/00650, filed on Jul. 9, 2001.

(30) Foreign Application Priority Data

Jul. 11, 2000 (FI) .............................................. 20001647

(51) Int. Cl.⁷ .................................................. F01N 3/04
(52) U.S. Cl. .......................................... 60/310; 60/316
(58) Field of Search ........................... 60/310, 312, 314, 60/316; 55/DIG. 30; 423/239; 239/428.5

(56) References Cited

U.S. PATENT DOCUMENTS

| | | | |
|---|---|---|---|
| 2,090,994 A | | 8/1937 | Brandes |
| 2,763,982 A | | 9/1956 | Dega |
| 3,664,135 A | * | 5/1972 | Lirette ........................ 60/310 |
| 3,713,277 A | * | 1/1973 | Sackett, Sr. .................. 55/223 |
| 3,824,769 A | * | 7/1974 | Santos et al. ................. 60/310 |
| 4,131,432 A | | 12/1978 | Sato et al. ................... 422/177 |
| 4,141,701 A | * | 2/1979 | Ewan et al. .................. 95/217 |
| 4,392,875 A | | 7/1983 | Celis .......................... 55/228 |
| 5,011,520 A | * | 4/1991 | Carr et al. ................... 96/234 |
| 5,464,458 A | | 11/1995 | Yamamoto .................... 55/223 |
| 5,983,633 A | * | 11/1999 | Woleslagle et al. ........... 60/312 |
| 6,026,641 A | * | 2/2000 | Liberty ........................ 60/274 |
| 6,032,462 A | * | 3/2000 | Chu ............................ 60/310 |
| 6,149,715 A | * | 11/2000 | Keinanen et al. ............. 95/219 |

FOREIGN PATENT DOCUMENTS

| | | | | |
|---|---|---|---|---|
| DE | 19855338 | | 6/2000 | |
| JP | 0030410 | * | 2/1983 | ................. 60/310 |
| JP | 0096417 | * | 6/1984 | ................. 60/310 |
| JP | 06-185340 | * | 7/1994 | ................. 60/310 |
| JP | 6200735 | | 7/1994 | |
| JP | 1162553 | | 3/1999 | |
| SU | 1206450 | * | 1/1986 | ................. 60/310 |
| TW | 347347 | | 12/1997 | |
| WO | WO 92/20453 | * | 11/1992 | |
| WO | WO 98/09684 | * | 3/1998 | |
| WO | 9913967 | | 3/1999 | |
| WO | 9913968 | | 3/1999 | |
| WO | 9944722 | | 9/1999 | |

OTHER PUBLICATIONS

English Abstract of JP 62 00735 dated Jul. 19, 1994.
English Abstract of JP 11 62553 dated Mar. 5, 1999.

* cited by examiner

*Primary Examiner*—Thomas Denion
*Assistant Examiner*—Diem Tran
(74) *Attorney, Agent, or Firm*—Ladas & Parry

(57) ABSTRACT

The invention relates to a method for purifying a gas flow, the method comprising spraying of water mist into the gas flow by utilizing at least one spray nozzle thereby causing a negative pressure in the immediate vicinity of the nozzle for sucking the gas flow into the sprayed spray. The method provides a simple and inexpensive method for purifying gases, such as exhaust gases from internal combustion engines. The invention further relates to an apparatus for implementing the method. The apparatus comprises a support structure (3) to which at least one spray nozzle (4) is arranged, the operation of the spray nozzle producing a suction that creates a negative pressure in the immediate vicinity of the spray nozzle.

20 Claims, 3 Drawing Sheets

METHOD AND APPARATUS FOR PURIFYING A GAS FLOW

This application is a continuation-in-part of International App. PCT/FI01/00650 filed on Jul. 9, 2001.

BACKGROUND OF THE INVENTION

The invention relates to a method and apparatus for purifying a gas flow.

Although the present method and apparatus can be applied for purifying gases in environments of very different character, the present method and apparatus are especially well suited for purifying exhaust gases of internal combustion engines, preferably diesel engines.

One objective in environmental protection is to reduce exhaust emissions of combustion engines. The present invention provides a solution for reducing the exhaust emissions of internal combustion engines.

Diesel engine exhaust emissions contain various harmful combustion products. They include gaseous carbon monoxide, which oxidises rapidly and forms carbon dioxide that contributes to the greenhouse effect, and volatile organic compounds, solid compounds, and particulates. When heavy oil burns, sulphur oxides $SO_x$, typically $SO_2$ and $SO_3$, are produced, which contribute to the acidification of soil and the production of smog. During the combustion process, some of the nitrogen gas present in the air oxidises to nitrogen oxides $NO_x$, particularly $NO$ and $NO_2$, which strongly contribute to the formation of smog, to the greenhouse effect and the acidification of soil and to retardation of forest growth, for example. In addition, a fuel that contains nitrogen may cause formation of nitrogen oxides.

The amount of sulphur emissions from diesel engines can be reduced by using low-sulphur fuel: the less sulphur the fuel contains, the lower are the sulphur emissions. Low-sulphur fuel can be produced in refineries, but at a high cost. The amount of sulphur oxides cannot be influenced by making changes to the combustion process.

Diesel engines of ships are major air polluters. According to a study made in the United States a few years ago, 14% of the world nitrogen emissions and 16% of sulphur emissions of oil exhaust gases originate from shipping. Nitrogen emissions from diesel engines are created most when the motor runs at a low power. In ships this typically takes place when the ship is in port, which is naturally regrettable.

The amount of nitrogen emissions of diesel engines can be reduced by decreasing the combustion temperature. The temperature can be decreased either by adding water into the fuel or by spraying an emulsion containing water into the combustion chamber. By decreasing the combustion temperature, the amount of nitrogen oxide emissions can be reduced by about 10%. A decrease in the combustion temperature reduces the efficiency of the engine.

Nitrogen emissions can be efficiently removed from exhaust gases with a catalytic converter in which a mixture of urea and water is sprayed into the fuel gases to reduce nitrogen oxides to nitrogen and water vapour. However, in marine applications, catalytic converters are very expensive; they account for about 30% of the engine cost, and even more in large ships. In addition, a catalytic converter requires servicing, and a space needs to provided for it in the ship.

U.S. Pat. No. 5,464,458 teaches a system in which diesel engine exhaust gases are purified using mist-like water. The system employs nozzles to spray water into a chamber containing a flow of exhaust gases to separate products contained in the exhaust gases from them. The system allows carbon in particular, but also carbon monoxide, hydrocarbons and nitrogen oxides, to be removed from the exhaust gases.

BRIEF DESCRIPTION OF THE INVENTION

It is an object of the present invention to provide a new, economical generally applicable solution for purifying a gas flow. The solutions is especially well suited for purifying exhaust gas emissions of internal combustion engines and especially large-dimension both two-stroke and four-stroke diesel engines, especially diesel engines of ships, the solution being implemented such that it does not complicate the discharge of exhaust gases from the engine.

To achieve this objective, the invention provides a method for purifying a gas flow, the method comprising spraying of water mist into the gas flow by utilizing at least one spray nozzle thereby causing a negative pressure in the immediate vicinity of the nozzle for sucking the gas flow into the sprayed spray. The sucking causes gas to be entrained into the sprayed spray.

The water mist is preferably created by a pressure of 10 to 300 bar and if applied to purifying exhaust gases of an internal combustion engine the spray is sprayed inside the exhaust manifold of the engine, and the engine, and the water mist is preferably sprayed in an at least approximately parallel direction with the exhaust gas flow.

Preferably at least part of the gases to be purified are deviated out of a principal flow path by the suction provided by the spray head.

To achieve the above-mentioned objective, the invention provides a apparatus comprising a support structure for holding at least one spray nozzle, the spray nozzle being arranged to spray water mist into the gas flow, wherein the spray nozzle is a spray nozzle the operation of which creates a suction causing a negative pressure in the immediate vicinity of the nozzle. The negative pressure draws the gases toward the spray nozzle and guides the gases into the water spray coming from the spray nozzle. This allows for an efficient reaction between the gases and water.

The spray nozzle is preferably arranged inside a reaction chamber which comprises an inlet opening for directing a flow of gases into the suction of the spray nozzle inside the reaction chamber.

Preferred embodiments of the apparatus of the invention are disclosed in the accompanying claims.

Major advantages of the present invention for purifying a gas flow are that it is fairly simple and inexpensive to implement; the invention can be applied to existing systems, included internal combustion engines, such as diesel engines of ships, and therefore only minor changes are needed for said implementation; the method and apparatus allows to guide the gases to be purified in desired direction. When applied to an internal combustion engines, the apparatus provides for an efficient, even improved, removal of exhaust gases from the engine. Moreover, the operating costs of the apparatus, with service costs included, are very low.

BRIEF DESCRIPTION OF THE DRAWINGS

In the following, the invention will be described in greater detail with reference to three embodiments and the accompanying drawings, in which.

DETAILED DESCRIPTION OF THE INVENTION

Figure 1:
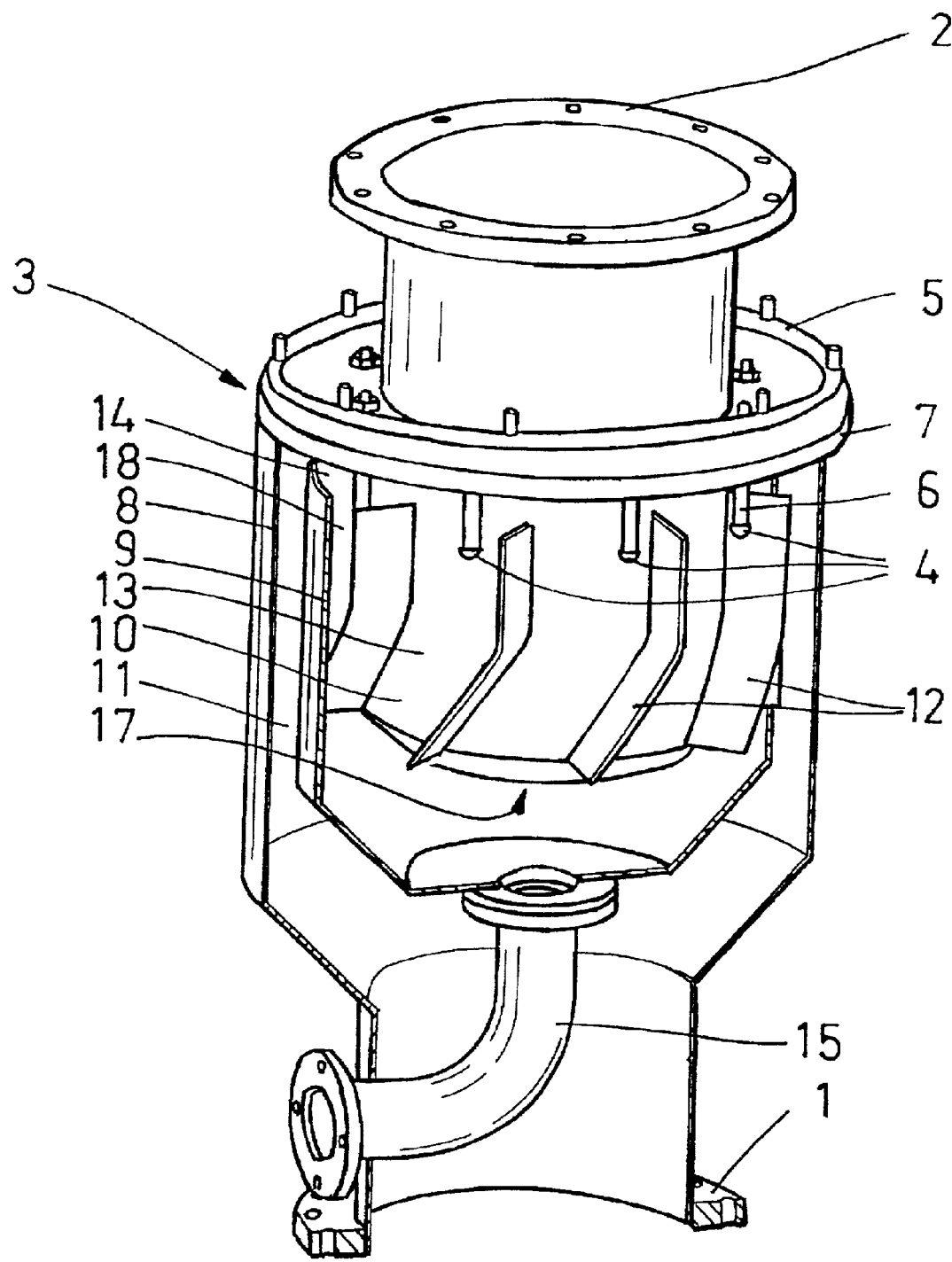
FIG. 1 illustrates a first embodiment of the invention.

FIG. 1 shows a preferred embodiment of the invention. The Figure shows an apparatus to be mounted to an exhaust pipe (not shown) of a diesel engine of a ship for purifying exhaust gases. If the diesel engine comprises a plurality of exhaust pipes, typically a plurality of purifying apparatuses may be provided.

The apparatus shown in FIG. 1 is mounted to an exhaust pipe at a position which is advantageous from the point of view of the exhaust gas temperatures and the mounting of the apparatus. The total height of the apparatus is relatively small whereby it is easy to find a mounting space for it. A small height is possible when the exhaust gases are sideways deviated out of their principal exhaust flow direction at the inlet.

The apparatus comprises an inlet flange 1 for receiving unpurified exhaust gases from the engine, and a discharge flange 2 through which the purified exhaust gases are discharged. The inlet flange 1, which is shown partly in section in the Figure, comprises a number of holes for fastening the apparatus to an exhaust pipe of the engine by utilizing bolts (not shown) to be inserted into the holes. The discharge flange 2 comprises a corresponding perforation to which can be attached an exhaust pipe portion through which the purified exhaust gases are discharged from the ship.

Between the flanges 1 and 2 there is provided a connection that allows the exhaust gases to be guided from the inlet flange 1 to the discharge flange 2.

The apparatus comprises a support structure, generally referred to with reference numeral 3, with a number of spray heads 4 attached thereto. The number of the spray heads 4 varies according to application; in the solution of the Figure there are 10 of them, but a solution where one is sufficient is also possible (in which case suction and spreading ducts may be arranged to produce a larger area of suction), whereas some solutions may comprise dozens of spray heads. The spray heads 4 are of a type that can be used at a high pressure causing a strong suction in their immediate vicinity. The pressure is within 10 to 300 bar, typically from about 20 to 100 bar. Each spray head 4 comprises preferably at least two nozzles arranged in a diverging position with respect to each other, and the structure of the head may be for example like the one disclosed in WO 92/20453. In principle only one nozzle may be enough, although one nozzle does not provide as strong suction effect as if there were two or more nozzles in the spray head 4. Due to the risk of clogging, the spray head 4 is preferably simple in structure. The spray heads are arranged in a circle at a distance from one another, and they are directed to produce substantially parallel sprays. Reference numeral 5 designates a pipe system for supplying water to the spray heads 4. The arrangement for supplying water into the pipe system 5 is not shown, because it is easy for a person skilled in the art to accomplish. In order to avoid the need to use the valuable water from the fresh water tanks, water known as grey water in ships is preferably used in the process. The arrangement comprises a pressure source (not shown) being able to provide a pressure of at least 10 bar via the pipe system 5 to the spray heads. Preferably the pressure source is a high-pressure source able to provide a pressure of at least 20 bar and up to 100–300 bar.

The spray heads 4 are fastened to the ends of rods 6, which are in turn fastened to a flange 7 of the support structure, the spray heads being suspended from the flange so that they produce a downward spray. The spray heads 4 can be easily detached from the flange 7 for cleaning. This is carried out by opening the fastening means (not shown in FIG. 1, but visible in FIG. 2 in which rods 6' are fastened with screws, nuts 60' or the like).

The apparatus comprises a mantle construction in the form of a cylindrical housing 8 with a first, concentric cylindrical wall 9 arranged inside it. Inside the cylindrical wall 9 is arranged a second, concentric cylindrical wall 10.

Between the housing 8 and the first cylindrical wall 9 there is provided a flow space 11 for unpurified exhaust gases.

Between the first and the second cylindrical spaces there is provided a space comprising guide plates 12 that divide the space into a plurality of reaction chambers 13 formed of tubes 130, each reaction chamber being provided with a spray head 4. The guide plates 12 are fastened to the second wall 10. Between the free side edges of the guide plates 12 and the first wall 9 is left a passage 18. The top edges of the guide plates 12 are at a distance from the flange 7, their bottom edges extending to the top edge of a discharge opening 17 provided in the wall 10. The function of the discharge opening 17 is to guide purified exhaust gases into the space enclosed by the wall 10 and from there further toward the discharge flange 2. The purified exhaust gases flow inside the wall 10 in the same direction as a direction in which unpurified exhaust gases enter the inlet flange 1. Said direction can be called direction of principal exhaust flow path. Seen in the direction of flow of the exhaust gases, the discharge opening 17 is located after the spray heads 4. Seen from the direction of flow of the exhaust gases, the spray heads 4 are located below the top edges of the guide plates 12, or on the same level as they. The guide plates 12 are at an angle to the spray heads 4, the spray heads thus spraying towards the guide plates.

Unpurified exhaust gases enter the reaction chambers 13 through an inlet opening 14. The inlet opening is formed of a port or a gap 14 between the top edge of the second wall 10 and the flange 7.

The bottom end of the first wall 9 of the reaction chamber 13 is conical, whereby reaction products formed in the reaction chambers are guided out of the reaction chambers through a discharge conduit 15 at the bottom. The discharge conduit 15 is supplied through a hole 16 in the flange 8 to guide the reaction products out of the apparatus.

The second wall 10 of the reaction chamber 13 also guides the reaction products formed in the reaction chamber 13 into the discharge conduit 15. From the discharge conduit 15, the reaction products are guided to a place where they do not cause any harm.

In the following, the operation of the apparatus of FIG. 1 will be described.

Unpurified exhaust gases flow into the apparatus through the inlet flange 1. If the spray heads 4 have not been activated, the exhaust gases flow through, the inlet opening 14 into the discharge opening 17 and from there the unpurified gases flow pass the discharge flange 2. As can be understood from the figure when flowing from the inlet flange to the discharge flange 2, the exhaust gases are deviated out of the principal exhaust flow path. If the spray heads 4 have been activated, the suction effect of the spray heads 4 draws unpurified exhaust gases to them through the inlet opening 14. These exhaust gases are guided into the mist-like water spray of the spray heads 4. Thus the suction of the spray heads 4 together with the geometry of the apparatus effects deviation of the exhaust gases out of the principal exhaust flow path. The droplet size in the water spray is very small, thereby allowing for an efficient reaction between the exhaust gases and the water. 90% of the volume of water (Dv90) is in droplets typically smaller than 200 $\mu$m, preferably smaller than 100 $\mu$m and most preferably smaller than 50 μm. The nitrogen oxides NO and $NO_2$ contained in the exhaust gases go through several reaction phases to form nitrogen acid. The following reaction formulae are approximations showing the starting products and the respective end product.

$$NO+H_2O+O_2 \rightarrow HNO_3 \quad (1)$$

$$NO+O_2 \rightarrow NO_2 \quad (2)$$

$$NO_2+H_2O \rightarrow HNO_3+X \quad (3)$$

Reaction (1) works already at room temperature, but it is significantly more effective at a temperature of 100–150° C. The reaction is efficient because the exhaust gases are hot.

Reaction (2) works well already at room temperature. Since it is not desirable to have nitrogen dioxide in exhaust gases, it is changed to nitrogen acid, cf. reaction formula (3). In the reaction according to formula 3, nitrogen acid is the only non-volatile end product. Formula 3 is believed to produce nitrogen acid effectively already at a temperature of 50° C.

Because of the nitrogen acid formation, the components of the apparatus must be made of materials that sustain nitrogen acid. A material suitable for the walls 9 and 10, guide plates 12 and discharge conduit 15 is for example austenitic stainless steel.

When the invention is being applied, the temperature in the reaction chamber 13 is selected to allow for nitrogen acid to be formed, avoiding, however, a simultaneous formation of nitrogen oxides that would be guided out of the apparatus. A temperature within the range of 50–150° C. could be suitable. This is a temperature inherently prevailing in exhaust pipes, or it can easily be created there (the water to be sprayed acting as a coolant). Since the reaction chamber contains a large number of chemical compounds, the reactions are very complex and they cannot be theoretically calculated. Due to this, the temperatures that are most suitable for as low emissions as possible to be produced must be discovered experimentally.

Water mist not only reduces the number of nitrogen oxides, but also purifies the exhaust gases of other non-desirable compounds.

The apparatus of FIG. 1 (and FIG. 2) is provided with a sensor (not shown) for measuring nitrogen oxide contents. The sensor is used for controlling the supply of water to the spray heads 4, which is carried out by regulating the water pressure. Water flow is reduced, or even interrupted, when emissions are low or when the ship is in an area where emissions are not very significant.

Figure 2:
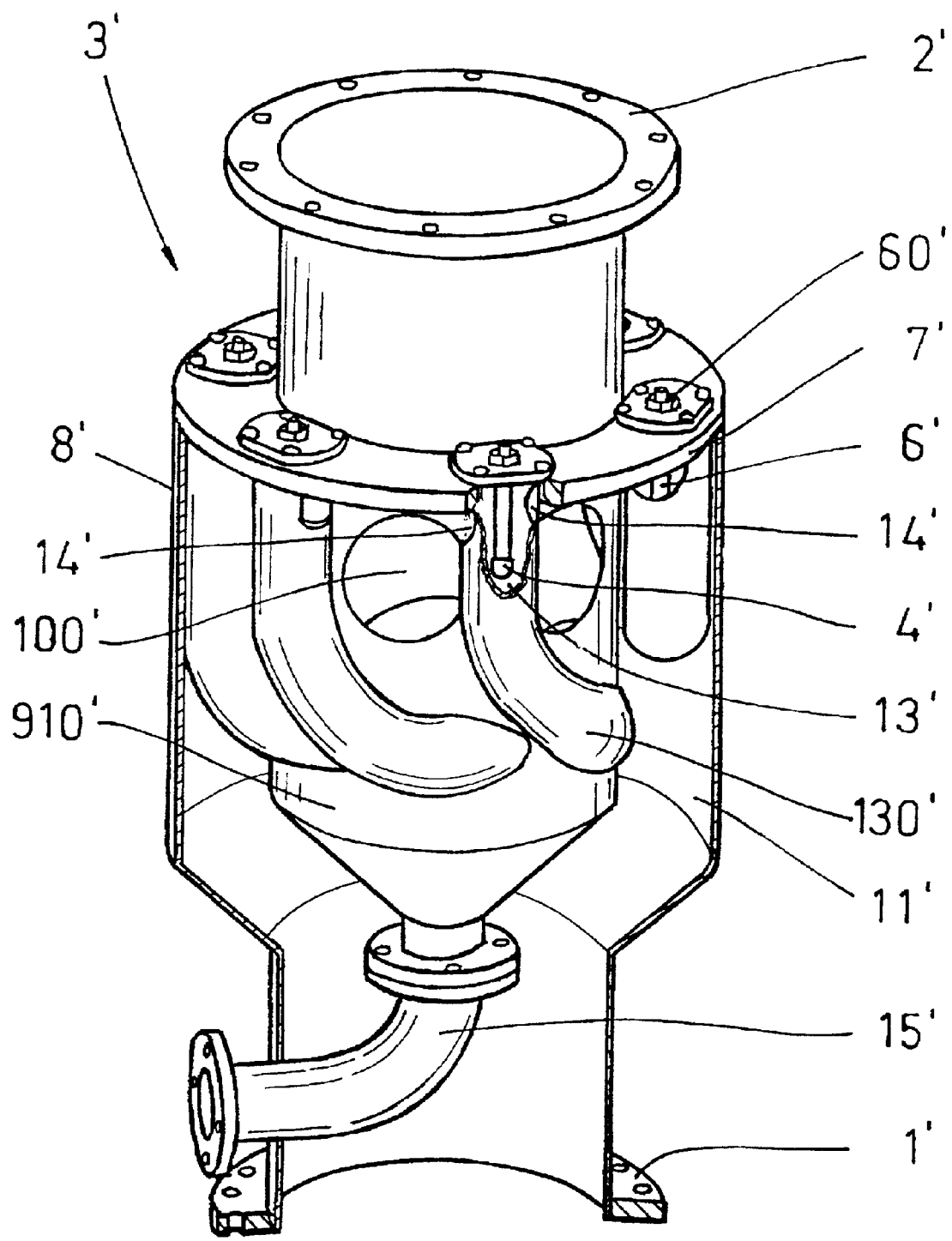
FIG. 2 illustrates a second embodiment of the invention.

FIG. 2 shows a second embodiment of the invention. In the Figure, the same reference numerals as in FIG. 1 are used for corresponding elements.

The embodiment of FIG. 2 deviates from the one in FIG. 1 in that a portion of the exhaust gases flow unpurified through bypass openings 100' provided in a wall 910' toward the discharge flange 2'. Compared with the arrangement of FIG. 1, this arrangement provides the apparatus with a different kind of resistance towards exhaust gas flow, which may be advantageous in certain types of diesel engines (two-stroke diesel engines). The number and size of the bypass openings 100' may vary from those given above.

The apparatus comprises seven reaction chambers 13' formed of tubes 130' provided with inlet openings 14' which allow unpurified exhaust gases to be sucked into the reaction chambers by impact of the spray heads 4' (suction impact). The tubes 130' are curved, i.e. they comprise a curved portion, the water sprays from the spray heads 2' thus hitting the wall of the tubes. The tubes 130' are connected to a space enclosed by the wall 910', the bottom end of which is formed to be conical so as to allow reaction products to be guided into a discharge conduit 15'. The number of the tubes 130' and reaction chambers 13' can naturally vary, similarly as in the embodiment of FIG. 1.

As can be understood from FIG. 2, the spray heads 4' can be easily removed from the flange 7' to which they are fastened (the screws 60' are unscrewed and the rods 6', together with the spray heads 4', are lifted up. The unit of conduits for supplying water to the spray heads 4' is not shown, because a person skilled in the art is capable of designing one.

Figure 3:
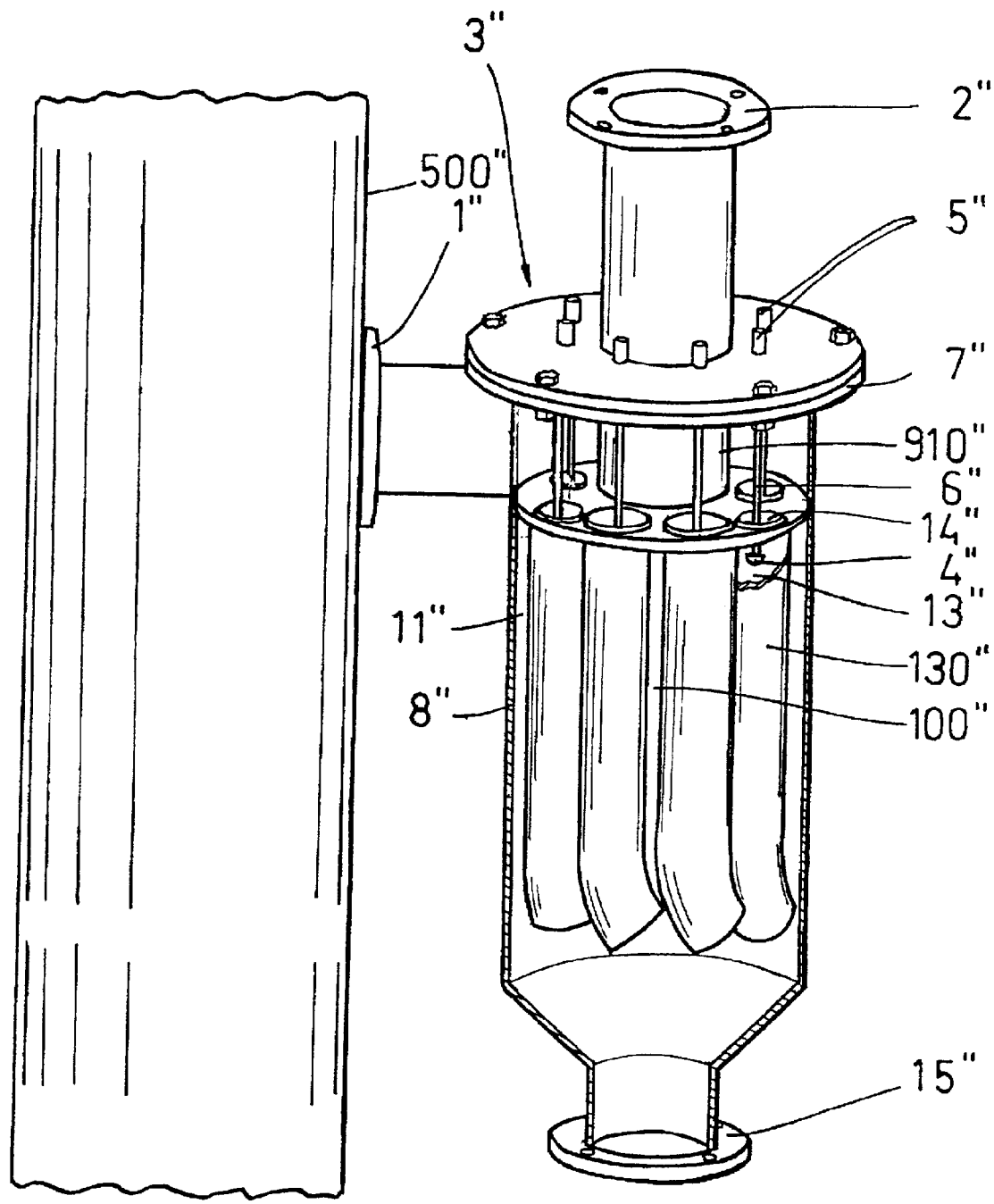
FIG. 3 illustrates a third embodiment of the invention.

FIG. 3 shows a third embodiment of the apparatus of the invention. In FIG. 3, same reference numerals as in FIGS. 1 and 2 are used for corresponding elements. The apparatus of FIG. 3 deviates from the those of FIGS. 1 and 2 in that the apparatus is meant to be fastened to the side of an exhaust manifold 500" of the diesel engine, the apparatus comprising an inlet flange 1" for this purpose. The discharge flange 2" of the apparatus and the discharge conduit 15" for the reaction products are made separate from the exhaust manifold 500". The apparatus of FIG. 3 is very simple to mount. The apparatus comprises a conduit 910" arranged inside a housing 8", an opening 100" being provided at one end (bottom end) of the conduit for directing the exhaust gas flows to the second end of the conduit (top end) provided with an exhaust gas discharge opening 2". The discharge flange 2" can be connected to the manifold 500".

In the above specification the invention is illustrated with reference to only three examples, on the basis of which it can be understood that the details of the invention may vary in many ways within the scope of the accompanying claims. The position of the discharge opening 17 of FIG. 1 and that of the bypass opening 100' of FIG. 2, for example, may vary; the number of the discharge and bypass openings may vary; the shape of the apparatus may deviate from the one shown here, although from the point of view of the flows and the manufacturing, and the cleaning of the apparatus, a cylindrical shape is preferred. There may be a plurality of discharge conduits 15, 15', 15", although it is recommended that the reaction products are guided in a centralized manner from the reaction chambers to a single discharge conduit, whereby it is not necessary to make several openings in the housing, and the reaction products can be removed from one and the same place. The direction of the spray heads 4, 4', 4" may vary, although it is preferred that they point downward, because then the sprays facilitate the removal of the reaction products from the apparatus. This does not mean, naturally, that the spray heads would need to point directly downward. In addition, downward directed spray heads allow for an apparatus of small dimensions and easy mounting. The apparatus and method can be also applied to the purification of a gas flow in general, i.e. not necessarily exhaust gases of diesel engines of ships or internal combustion engines.

What is claimed is:

1. In a method for purifying exhaust gases of an internal combustion engine, the improvements comprising:

spraying water mist created by a spraying pressure of 10 to 300 bar into a first portion of the exhaust gases for causing a negative pressure about the spraying and sucking the first portion of the exhaust gases into the spraying, and guiding a second portion of the exhaust gases through a bypass past the spraying for controlling flow resistance of the exhaust gases.

2. A method according to claim 1, wherein the spraying is inside an exhaust pipe of the internal combustion engine.

3. A method according to claim 1, wherein the spraying is in a direction at least approximately parallel to a direction of flow of the exhaust gas.

4. A method according to claim 1, wherein the gas is flowing in a principal flow path and further comprising deviating at least part of the gas out of the principal flow path with the sucking.

5. A method according to claim 1, wherein the internal combustion engine is a diesel engine of a ship and further comprising supplying ship's grey water for the water mist.

6. An apparatus for purifying exhaust gases of an internal combustion engine, the apparatus comprising a support structure for holding at least one spray nozzle, means for creating a spraying pressure of 10 to 300 bar for the spray nozzle, the spray nozzle being arranged to spray water mist into the exhaust gases, wherein the spray nozzle and spraying pressure create a suction causing a negative pressure in the immediate vicinity of the spray nozzle, and being arranged inside a reaction chamber which comprises an inlet opening for directing a first portion of the exhaust gases into the suction of the spray nozzle, the suction being inside the reaction chamber, and means for guiding a second portion of the exhaust gases through a bypass past the reaction chamber.

7. An apparatus according to claim 6, wherein the spray nozzle is arranged to spray in a direction that speeds up discharge of the exhaust gases from the engine.

8. An apparatus according to claim 6, wherein the reaction chamber is connected to a discharge conduit for receiving from the reaction chamber the exhaust gases, water mist and reaction products formed of the water mist and exhaust gases and for guiding them out of the apparatus.

9. An apparatus according to claim 8, wherein the reaction chamber is surrounded by a mantle, and between the mantle construction and the reaction chamber there is a flow space which conveys the exhaust gases to the inlet opening of the reaction chamber.

10. An apparatus according to claim 8, comprising a mantle and a conduit comprising a first end and a second end, the conduit being arranged inside the mantle, the spray nozzle being arranged in a space between the mantle and the conduit, the first end of the conduit comprising an opening for directing a flow of purified exhaust gases to the second end of the conduit which is provided with an exhaust gas discharge opening.

11. An apparatus according to claim 10, comprising a plurality of spray nozzles mounted to the support structure in the form of a circle between the mantle and the conduit and at a distance from one another, the spray nozzles being arranged inside respective tubes which form reaction chambers.

12. An apparatus according to claim 11, wherein the tubes comprise a curved portion and they lead to a space defined inside the wall, said discharge conduit being in communication with said space.

13. An apparatus according to claim 6, comprising fastening means for mounting the apparatus to a manifold of the internal combustion engine.

14. An apparatus according to claim 13, wherein the fastening means comprise an inlet flange provided with an opening for conveying the exhaust gases of the internal combustion engine into the apparatus, and a discharge flange provided with an opening for conveying the exhaust gases out of the apparatus.

15. An apparatus according to claim 14, wherein the inlet flange is formed to be fastened to a side of the exhaust manifold of the internal combustion engine.

16. An apparatus for purifying a gas flow, the apparatus comprising a support structure for holding a spray nozzle, means for creating a spraying pressure of 10 to 300 bar for the spray nozzle, the spray nozzle being arranged to spray water mist into the gas flow, wherein the spray nozzle is a spray nozzle the operation of which creates a suction causing a negative pressure in the immediate vicinity of the spray nozzle, wherein the spray nozzle is arranged inside a reaction chamber which comprises an inlet opening for directing the gas flow into the suction of the spray nozzle and the suction is inside the reaction chamber, wherein the reaction chamber is connected to a discharge conduit for receiving from the reaction chamber exhaust gases, water mist and reaction products formed of the water mist and exhaust gases, wherein the reaction chamber is surrounded by a mantle, and between the mantle and the reaction chamber there is a flow space which conveys the exhaust gases to inlet opening of the reaction chamber, wherein part of the flow space is defined by a first wall which is at a distance from the mantle and partly defines the reaction chamber, wherein the first wall is arranged to convey the reaction products into the discharge conduit, wherein part of the reaction chamber is defined by a second wall which is arranged to convey the reaction products into the discharge conduit, and further comprising a plurality of spray nozzles mounted to the support structure in a circle between the first wall and the second wall and at a distance from one another, guiding plates being provided between the walls, and the plurality of spray nozzles being arranged to spray towards the guiding plates.

17. An apparatus according to claim 16, wherein the bypass opening is in a wall which is arranged to guide the reaction products from the reaction chamber into the discharge conduit.

18. An apparatus according to claim 17, comprising a plurality of spray nozzles mounted to the support structure in the form of a circle between the mantle and the wall and at a distance from one another, the spray nozzles being mounted inside respective tubes which form reaction chambers.

19. An apparatus according to claim 16, wherein the spray nozzles are detachably fastened to a flange of the support structure from which they are suspended and can be detached by lifting.

20. An apparatus according to claim 16, wherein the first wall and the second wall are cylindrical and at least approximately concentric.

* * * * *